March 12, 1963
R. BUCHMANN
3,080,612
PROCESS OF MOLDING FOAM PRODUCTS FROM
WASTE FOAM MATERIALS
Filed March 10, 1958
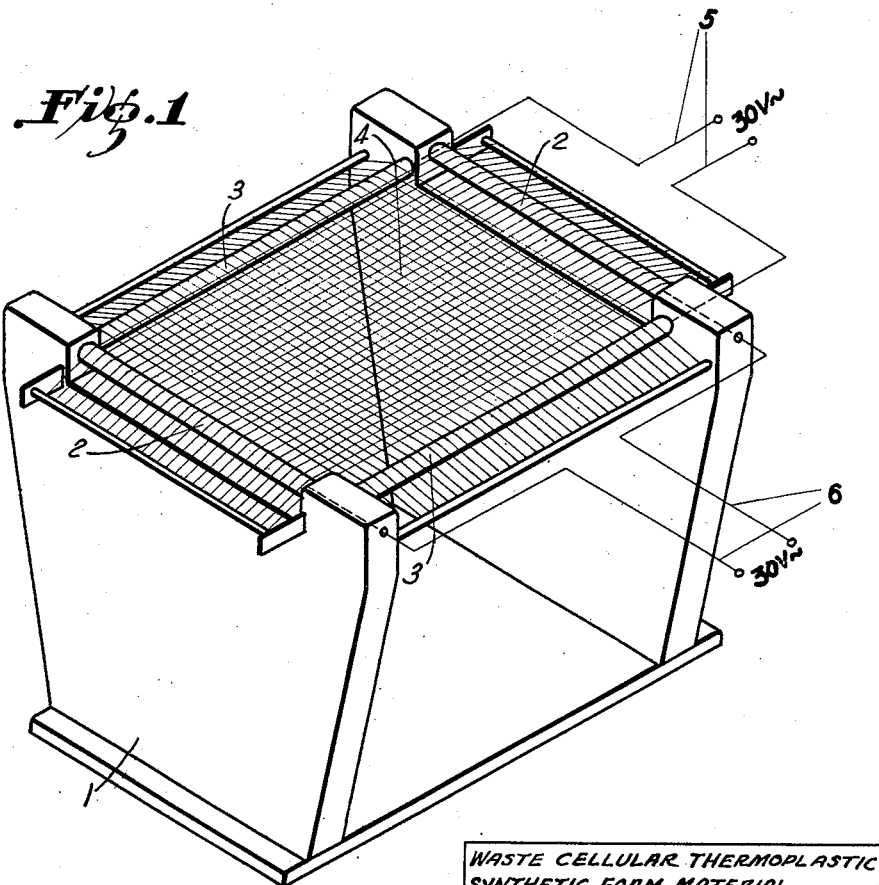
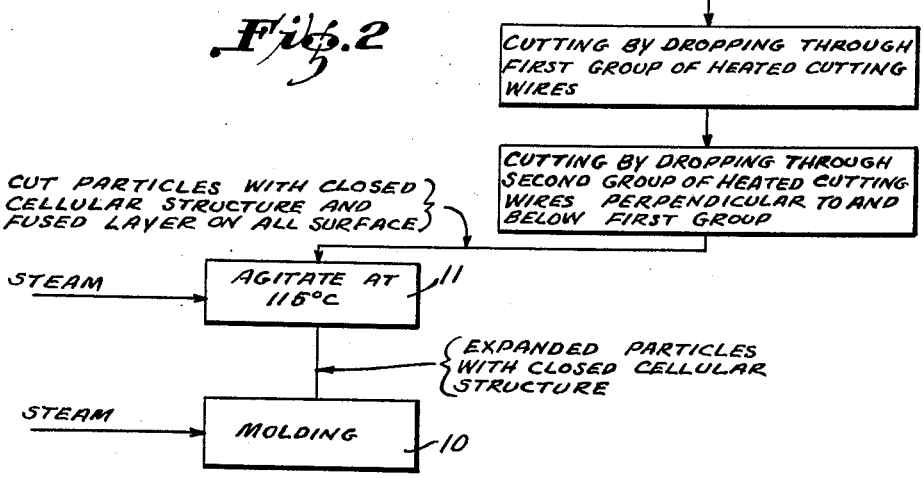

3,080,612
PROCESS OF MOLDING FOAM PRODUCTS FROM WASTE FOAM MATERIALS

Rudolf Buchmann, Mannheim-Feudenheim, Germany, assignor to Medultra Werner Matzler, Zurich, Switzerland
Filed Mar. 10, 1958, Ser. No. 720,478
Claims priority, application Germany Mar. 9, 1957
3 Claims. (Cl. 18—48)

This invention relates to a process for making waste from thermoplastic synthetic foam materials utilisable.

In the preparation of sheets and blocks from thermoplastic synthetic foam materials, considerable waste occurs in the form of cuttings of varying thicknesses and sizes.

The manufacturing industry is desirous of utilising this material in some form, it being sought to return to it, as far as possible, the original raw material value.

As is known the raw material for example for foam material on a basis of polystyrene is produced in the form of particles containing expanding medium, and is pre-expanded in the manufacturing stage, before the actual formation into moulded articles. The pre-expanded particles have a size of about 3–10 mm., and resemble irregularly shaped beads. Every one of these beads possesses a closed surface skin, which encloses numerous micro-cells which are closed upon themselves.

In the welding of these fresh particles to one another the increase of volume of the air-expanding medium mixture contained in the micro-cells, occurring as a result of the supply of heat, is an essential prerequisite for the production of homogeneous moulded articles.

The surface skin of the beads, on supply of heat, forms a plastic film which, under the pressure forming in the interior of the beads, leads to uniting of the particles which previously lay loosely against one another, while at the same time the water vapour, introduced as heat carrier and washing round the beads, and the condensate formed therefrom, are forced out of the moulded article again.

The fact that the undamaged surface skin on the one hand and the closed cellular structure on the other hand are main pre-requisites for the formation of satisfactory articles of foam material appears in the attempt to cut up the initially mentioned waste or reject pieces into small pieces in beater-blade mills or spiked rolls, and to manufacture these small pieces, together with fresh pre-expanded material, into moulded articles again.

Due to the mechanical breaking up there takes place at the same time a destruction of the cellular structure, if not throughout, at least at the points of separation of the cut pieces.

The open cells at the points of separation impart to the particles a sort of sponge structure, they absorb the condensate occurring in the forming process due to the introduction of steam, prevent the formation of an over-pressure in the interior of the particles, and do not weld to the particles of waste or fresh material surrounding them.

Experiments have shown that where ground waste is mixed in, moulded articles only hold together poorly under an additional pressure from the exterior, and display an increase in weight due to the absorption of condensate, up to five times the weight of the introduced mixture.

Since such sheets do not satisfy the usual requirements as regards quality and the possibility of manufacturing, in order to avoid the above-described defects a process, a device and a manufactured product will be explained in greater detail by way of example hereinafter.

The invention is based upon the fact that satisfactory welding is possible only between particles with closed cellular structure, it being specially important that the surface of the particles should also possess no torn-open cells.

In order to obtain waste with the required properties for further handling, the residue sheets and cuttings which occur are cut up with the aid of electrical resistance wires, when a thin fused layer is produced on the cut faces of the cut-up parts by the resistance wire carrying out the cutting operation, which fused layer homogeneously closes the surface of the particles, and imparts to the particles for the subsequent further handling the same properties as fresh raw material.

The expedient procedure is that the residual pieces, which usually occur as sheet cuttings of irregular dimensions, in thickness of about 5–15 mm., are divided into cubes of 10 x 10 mm. Larger reject pieces are first cut into sheets of about 10 to 20 mm. thickness, with the aid of electrical resistance wires, so that the cut surfaces of the sheets also possess a closed cellular structure.

The cut parts in fact possess a form differing from the freshly pre-expanded particles, since however in their other properties they react exactly like fresh material, in the finished moulded articles this is merely a defect of appearance.

In order to adapt even the form of the particles to fresh material, it is expedient to subject the cut material to a repeated expansion. With simultaneous increase of volume the particles, which were previously of cubic shape, then assume irregular shapes.

Admixtures of the particles thus prepared, up to 50%, do not cause any reduction of quality. The moulded articles thus produced do not display any absorption of water exceeding the measure usual in fresh material. In special cases shaped articles can be produced even only from waste pieces, without fresh material.

The device proposed for the production of the cut pieces will be described in greater detail by reference to the accompanying drawing.

FIGURE 1 shows a cutting apparatus, the cutting wires of which are so constructed, arranged, and connected with a source of current that for example when thermoplastic materials are placed thereon, cutting up takes place according to the arrangement of the cutting wires. FIGURE 2 illustrates schematically the process steps of the invention.

Electrical resistance wires 4 are stretched at intervals of 1 cm. from one another in each case, in various planes, over the frame 2 and the frame 3 of a box-like structure 1, over an area of one square meter in each case, in intersecting arrangement.

The two frames 2 and 3 are situated with a mutual spacing at which contact of the crossing wires is impossible. Through the current-feed arrangement 5 and 6 the wires are brought to a temperature which is sufficient to cause the thermoplastic sheets of synthetic material which are placed upon the wires to melt.

The sheets then pass through the two planes of wires and fall beneath the frame 3 in the form of completely uniform cubes 7,7 of a size for example of 10 x 10 mm. The procedure can be repeated continuously by constant placing-on of fresh residue sheets. The formation of moulded articles using the waste materials prepared in accordance with the invention, and the moulded articles themselves, will be described in greater detail by reference to three examples:

(1) Into a mould 10 of 1,000 x 500 x 400 mm. there are placed 100 litres of pre-expanded particles, containing expanding medium, of polystyrene with weight per unit volume of 20 kg. per cu. m., and 100 litres of particles produced from previously moulded articles, with formation of a closed surface by means of cutting up with electrical resistance wires, with approximately equal weight per unit volume, are so mixed in that a uniform distribution takes place. The mixture is welded in the usual manner, by means of the introduction of steam, into a moulded article (block). The block produced has a final weight of about 4.2 kg. and can be handled by the usual methods for example cut into sheets by means of electrical resistance wires. Its water absorption and steam impermeability correspond approximately to the values known for normal material.

(2) Into a mould 10 of 500 x 500 x 400 mm. there are placed 100 litres of prepared waste material, with weight per unit volume of 20 kg. per cu. m. In order to achieve a homogeneous welding of the particles even without admixture of fresh material, the lid of the mould is closed down, before the introduction of steam, so that the height of the mould is reduced to 300 mm. Due to this pressing the cavities, which are greater between the cut particles than in the case of fresh material, are substantially reduced, so that the increase of volume occurring on the introduction of steam is sufficient to bring about a relatively good welding of the waste pieces. The moulded article thus produced has a weight per unit volume of about 22 kg. per cu. m. and contains no more than the usual residual moisture.

(3) 1 cubic metre of prepared waste pieces of weight per unit volume of 20 kg. per cu. m. are re-expanded in an agitating mechanism 11 for 5 minutes at 115° C., with constant introduction of steam. In this process they increase their volume by 20%, with variation of the previously regular cut shape, and after interstratification as previously described in Examples 1 and 2 can be handled further.

I claim:

1. A process for making a molded article of at least a portion of thermoplastic synthetic foam materials and having a pair of spaced fused surface layers thereon, comprising converting waste from said thermoplastic synthetic foam materials into pieces by dropping said waste material through a series of heated electrical resistance cutting wires so as to cut said waste material in successively perpendicular directions in a direction transverse to each of said spaced surface layers so as to form a closed fused surface on said pieces and completely seal off the cellular structure of each of said pieces from the ambient atmosphere, placing said pieces into a mold, and introducing steam to homogeneously weld said pieces together.

2. A process for making a molded article of at least a portion of waste thermoplastic synthetic foam materials and having a pair of spaced fused surface layers thereon, comprising converting waste from said thermoplastic synthetic foam materials into pieces by dropping said waste material through a series of heated electrical resistance wires so as to cut said waste material in successively perpendicular directions in a direction transverse to each of said spaced surface layers so as to form a closed surface on said pieces and completely seal off the cellular structure of each of said pieces from the ambient atmosphere, placing at least said pieces into a mold, applying pressure to said pieces in said mold to reduce hte total volume thereof, and then introducing steam into said mold to weld said pieces together.

3. A process for making a molded article of at least a portion of waste thermoplastic synthetic foam materials having a cellular structure and having a pair of spaced fused surface layers thereon, comprising converting waste from said thermoplastic synthetic foam materials into pieces by dropping said waste material through a series of heated electrical resistance wires so as to cut said waste material in successively perpendicular directions in a direction transverse to each of said spaced surface layers so as to form a closed fused surface on said pieces and completely seal off the cellular structure of each of said pieces from the ambient atmosphere, agitating said pieces at approximately 115° C. with constant introduction of steam to increase the volume of said pieces approximately 20%, and subsequently placing at least the expanded waste pieces into a mold and welding same together by introducing steam into said mold.

References Cited in the file of this patent

UNITED STATES PATENTS

| | | |
|---|---|---|
| 1,381,654 | Muschewske et al. | June 14, 1921 |
| 2,051,628 | Wenrich et al. | Aug. 18, 1936 |
| 2,165,573 | Pfeil | July 14, 1939 |
| 2,629,899 | Aller | Mar. 3, 1953 |
| 2,677,747 | Jaye | May 4, 1954 |
| 2,692,328 | Jaye | Oct. 19, 1954 |
| 2,727,128 | Jaye | Dec. 13, 1955 |
| 2,787,809 | Stastny | Apr. 9, 1957 |
| 2,838,801 | De Long et al. | June 17, 1958 |

OTHER REFERENCES

Plastics, Plastics Scrap Materials—Some Notes on Their Treatment and Use, vol. 18, No. 193, August 1953, pp. 285 and 292.